United States Patent [19]

Asanuma et al.

[11] Patent Number: 4,659,755

[45] Date of Patent: Apr. 21, 1987

[54] METHOD OF CONTINUOUSLY OPERATING A COUNTER-FLOW WASHING COLUMN

[75] Inventors: Tadashi Asanuma; Tatuo Ohoka; Yoshiyuki Funakoshi, all of Osaka, Japan

[73] Assignee: Mitsui Toatsu Chemicals, Incorporated, Tokyo, Japan

[21] Appl. No.: 746,848

[22] Filed: Jun. 20, 1985

[30] Foreign Application Priority Data

Jun. 21, 1984 [JP] Japan .................................. 59-126496

[51] Int. Cl.$^4$ ................................................ C08F 6/24
[52] U.S. Cl. .................................... 523/303; 523/315; 528/498; 528/501; 528/503; 210/744
[58] Field of Search ................. 528/498, 503, 501; 210/104, 774; 422/261; 523/303, 315

[56] References Cited

U.S. PATENT DOCUMENTS

| | | | |
|---|---|---|---|
| 3,324,093 | 6/1967 | Alleman | 528/498 X |
| 3,644,583 | 2/1972 | Scoggin | 525/322 |
| 4,126,743 | 11/1978 | Shiomura et al. | 528/503 |

Primary Examiner—Joseph L. Schofer
Assistant Examiner—F. M. Teskin
Attorney, Agent, or Firm—Wenderoth, Lind & Ponack

[57] ABSTRACT

The method of continuously operating a counter-flow washing column which is supplied with a slurry of solid polymer particles in a diluent from a continuous polymerization zone and with washing liquid for extracting wash slurry and introducing it into a heat tube to separate the vapor of the washing liquid and the solid polymer particles.

The improvement involves controlling the extraction amount of the wash slurry from the column by means of:

(i) controlling the quantity of heat added to the heat tube, and further (ii) controlling the amount of liquid to be separately introduced into the heat tube, said controls (i) and (ii) being determined by monitoring the amount of the slurry in the last one of reaction cells in the continuous polymerization zone and, on the basis of the monitored amount, determining the amount of extracted slurry.

When larger fluctuations occur in the production of the amount of slurry in the continuous polymerization zone, further controls are made to prevent drastic fluctuations in the ascending viscosity of the washing liquid in the counter-flow washing column, on the basis of the differences between the amount of the vapor separated by the heat tube and the amount of the liquid separately introduced into the heat tube.

5 Claims, 1 Drawing Figure

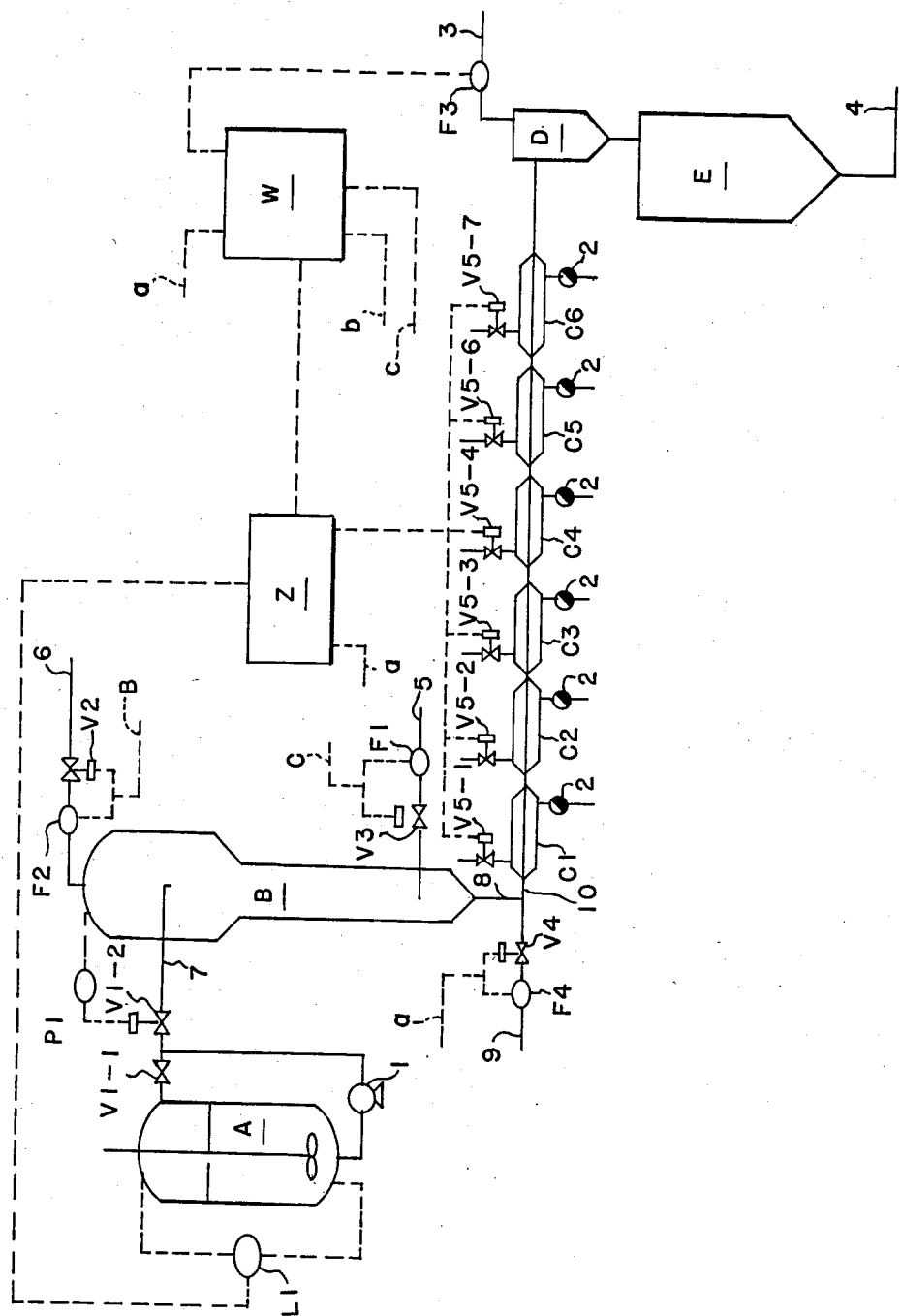

METHOD OF CONTINUOUSLY OPERATING A COUNTER-FLOW WASHING COLUMN

BACKGROUND OF THE INVENTION

1. Field of the Invention

This invention relates to a method of continuously operating a counter-flow washing column, and more particularly, to a method of continuously operating a processing system comprising a continuous polymerization zone, a counter-flow washing column and a heat tube for separating solid polymer particles.

2. Description of the Prior Art

In the manufacture of polymers on an industrial scale, the polymerization reaction, i.e. the polymerization of the monomers, is conventionally carried out in a diluent which does not dissolve the polymer so that the resulting polymer is produced in the form of a slurry of solid polymer particles and a diluent. The reaction is ordinarily carried out in such a diluent because the heat of polymerization can be easily removed and the polymer can be relatively easily separated from the unreacted monomers and the reaction medium. This process is particularly carried out in the polymerization of olefins, which reaction involves a large amount of polymerization heat.

In such polymerization systems, particularly in the polymerization of olefins, it is also known to wash the slurry in a counter-flow washing column in order to remove the residue of the catalyst used for the polymerization of olefins, which catalyst includes transition metals and organic metal compounds. In such olefin polymerization systems, there are used as diluents and washing liquids, liquids having a relatively low boiling point and the washed slurry is heated in a heat tube for the purpose of separating the slurry into solid polymer particles and to convert the diluent into a vapor. Such processes as described above are disclosed in such patents as U.S. Pat. Nos. 3,262,922, 3,644,583, 3,285,899 and 3,428,619.

The washing of the slurries in a counter-flow washing column by the reference processes, is carried out in each case by relying only upon the density differences between the solid polymer particles and the diluent, which means that the slurry in each of the reference processes can be effectively washed only if the amounts of liquid and slurry introduced into the counter-flow washing column through various ports and the amounts of liquid and slurry discharged therefrom are always constant; however, the washing cannot be effectively carried out if the discharged liquid and slurry are not always constant.

In an actual polymerization process, the production performance fluctuates due to the changes in the catalytic action, the molecular weight of the polymer and the ratio of the monomers in, for example, a copolymerization reaction. This means that the amount of slurry introduced into the counter-flow washing column and the ratio of the solid polymer particles and diluent fluctuates as the aforementioned parameters change. This fluctuation according to the prior art methods destroys the balance between the washing liquid and the solid polymer particles in the counter-flow washing column and causes decreased washing efficiency in the counter-flow washing column which may adversely affect the quality of the solid polymer particles. Further, as the case may be, solid polymer particles may be entrained with the washing liquid to be extracted from the upper portion of the counter-flow wasing column and may affect the step of recovering the washing liquid. Also, the concentration of the washed slurry to be extracted from the lower portion of the counter-flow washing column may be changed and, as the case may be, such change may make extraction by this method nonfeasible. Thus, the prior art methods have encountered many difficulties.

SUMMARY OF THE INVENTION

The present inventors have done intensive research to solve the above-mentioned problems of the prior art and have discovered a method of controlling certain parameters in the counter-flow washing column which has made it possible to overcome the problems encountered by the prior art methods.

The purpose of the present invention is, therefore, to provide a method of operating a counter-flow washing column in such a manner as to permit the slurry of the solid particles to be washed in a constant and efficient manner so as to obtain solid polymer particles.

Thus, the present invention concerns, as a first embodiment, a method of continuously operating a counter-flow washing column by:

(a) introducing a slurry, which consists of solid polymer particles and a diluent and is continuously extracted from a continuous polymerization zone, into the upper portion of the counter-flow washing column, (b) introducing washing liquid into the lower portion of the counter-flow washing column and extracting it from the upper portion of the counter-flow washing column, and (c) extracting washed slurry from the lower portion of the column and introducing it into a heat tube to separate the vapor of the washing liquid and the solid polymer particles, characterized in that the extraction amount of the washed slurry from the lower portion of the column is controlled by means of:

(i) the quantity of heat added to the heat tube, and further (ii) as occasion demands, the amount of liquid separately introduced into the heat tube, and, as the control factor, the amount of the slurry in the last reaction cell of the continuous polymerization zone is monitored and used to control the extraction amount of the washed slurry via control means (i) and (ii).

The present invention also concerns, as a second embodiment, a method of continuously, operating a counter-flow washing column by:

(a) introducing a slurry, which consists of solid polymer particles and a diluent and is continuously extracted from a continuous polymerization zone, into the upper portion of the counter-flow washing column, (b) introducing washing liquid into the lower portion of the counter-flow washing column and extracting it from the upper portion of the counter-flow washing column, and (c) extracting washed slurry from the lower portion of the column and introducing it into a heat tube to separate the vapor of the washing liquid and the solid polymer particles, characterized in the (I) the extraction amount of the washed slurry from the lower portion of the column is controlled by means of:

(i) the quantity of heat to be added to the heat tube, and further (ii) as occasion demands, the amount "A1" of liquid separately introduced into the heat tube, and, as the control factor, the amount of the slurry in the last reaction cell of the continuous polymerization zone is determined and used as in the first embodiment, and further (II) the amount of the washing liquid to be introduced into the lower portion of the counter-flow washing column is controlled by means of (iii) the amount "A3" corresponding to the difference between the amount "A2" of the vapor separated by the heat tube and the amount "A1" of the liquid to be separately introduced.

DESCRIPTION OF THE DRAWING

The attached FIGURE is a diagram showing a process system flow chart pertaining to one example of conducting the process according to the present invention.

In the drawing, the various designations are defined as follows:
A—last reaction cell,
B—counter-flow washing column,
C1, C2-C6—heating jackets,
D—cyclone,
E—hopper,
1—pump,
2—steam trap,
3—vapor discharge line,
4—polymer particles discharge line,
5—washing liquid introduction line,
6—washing liquid extraction line,
7—slurry introduction line,
8—slurry extraction line,
9—liquid introduction line,
10—heat tube
W, Z—controllers,
V1-1, V1-2-V5-7 —valves,
P1—pressure detector,
F1, F2, F3, F4—flow-amount detectors,
L1—liquid surface detector,
Broken lines—lines of control system,
Broken lines connected to controllers W and Z—input and output lines, and
a, b, c—indicating connections of the broken lines with those having the same symbols.

DETAILED DESCRIPTION OF THE INVENTION

For purposes of carrying out the present invention, there is no limitation as to the particular polymerization process per se to be employed in the polymerization zone, nor are there any limitations regarding the catalyst system, the reaction temperature, the reaction pressure, etc. as is evident from the above summary of the invention. In fact, all polymerization processes which allow introduction of solid polymer particles into a washing column in the form of a slurry with a diluent can be used. Preferably, however, those processes are employed which use as a diluent, a liquid having a relatively low boiling point and particularly one that is gaseous at normal temperature and under normal pressure.

In the present invention, the slurry consisting of polymer particles and a diluent (hereinafter referred to simply as the "slurry") may be any of those slurries which contain anything to be washed out in the counter-flow washing column (including anything which is dissolved in the diluent but has to be removed) and so no particular limitation is given thereto. However, in respect to necessity and the efficiency of washing the slurry by means of such counter-flow washing, the slurry which is most applicable to the present invention is the combination of propylene polymers (including copolymers of propylene and other mono-olefins) and liquids mainly consisting of liquid propylene as a diluent. This is because (a) the yield of polypropylene per unit amount of catalyst is generally low and so it is necessary to include a step for removing the residue of the catalyst used, (b) low stereospecific polymers of relatively low molecular weight are by-produced in the polymerization of polypropylene and they adversely effect the physical properties of the thus-obtained polymer, and (c) the difference in density between polypropylene and liquid propylene is relatively large and is conducive to be washed efficiently by such a counter-flow washing method, although the reasons for this are not quite clear.

In the present invention, the polymerization zone preferably is one that includes a reaction cell of the complete mixing type having a gas phase space as the last reaction cell in the continuous polymerization zone, namely as the preceding stage just before the introduction of the slurry into the counter-flow washing column.

According to the present invention, the slurry is continuously introduced into the counter-flow washing column from the above mentioned last reaction cell in the continuous polymerization zone. The counter-flow washing column may be one which is constructed or designed to permit the introduction of a slurry of solid materials from its upper portion and a washing liquid from its lower portion and one which permits extraction of the washing liquid from its upper portion and the washed slurry of solid materials from its lower portion. Preferably the column is one which is long in the vertical direction and having the form of vertical cylinder. The column may be further constructed such as (a) to have a larger diameter in the upper portion so that any entrainment of solid materials with the washing liquid extracted from the upper portion may be avoided, (b) to enable soft stirring for the purpose of improving the contact between the washing liquid and the solid materials, and (c) one which has nozzles for improving the dispersion of the solid materials and the distribution of the washing liquid, etc.

As to the temperature and pressure conditions of the counter-flow washing column to be operated in accordance with the present invention, it is preferable to employ a pressure approximately equal to or slightly lower than the pressure of the last reaction cell of the continuous polymerization zone and a temperature somewhat lower than the temperature of the last reaction cell. For this purpose, it is necessary to operate the counter-flow washing column such that it has no gas space, that is, in the state of "full liquid", because such gas space would cause pressure fluctuations due to temperature fluctuations making it difficult to keep the charge amounts of the slurry and the washing liquid in the counter-flow washing column at a constant level. The "full liquid" state operation automatically adjusts the pressure to a level approximately equal to the pressure of the last reaction cell of the continuous polymerization zone.

If the temperature of the counter-flow washing column is higher than the temperature of the last reaction cell, the flow of washing liquid is disturbed owing to the density difference and so the washing efficiency is badly affected. For a similar reason, it is necessary to control the temperature of the washing liquid introduced into the counter-flow washing column at a temperature lower than the temperature in the counter-flow washing column, to be able to operate with stable washing efficiency.

According to one embodiment of the present invention, in the case wherein the production of the slurry in the continuous polymerization zone is relatively stable, the introduction of the washing liquid into the counter-flow washing column and the extraction of the same therefrom are always kept constant by means of flow-amount controllers. Thus, relatively small fluctuations of the roduction amount of the slurry in the continuous polymerization zone, namely fluctuations to an extent of the range ±5% observed in the relatively stable condition may be treated in the following manner.

The amount of the washed slurry to be extracted from the lower portion is changed in accordance with the amount of the slurry in the last polymerization reaction cell, which practically is detected by the level of the slurry in the cell. More concretely, as the level of the slurry elevates (or lowers), the amount of the washed slurry to be extracted from the lower portion is increased (or decreased), thereby changing the amount of the slurry introduced into the counter-flow washing column. Eventually, the level of the slurry in the last polymerization reaction cell is kept constant. In this connection, it is essentially necessary to change the extraction amount of the washed slurry by changing (a) the quantity of heat applied to the heat tube and (b) the amount of the liquid separately introduced as occasion demands. It is not appropriate to place a valve between the counter-flow washing column and the heat tube to control the extraction amount of the washed slurry by an open/shut arrangement or by adjusting the degree of opening of the valve, because such valve operation would disturb the flow of the washing liquid in the counter-flow washing column and badly affect the washing efficiency.

The quantity of heat to be applied to the heat tube may be changed by the following manner. The heat tube is provided with multiple divisional jackets through which a heating medium, preferably steam, can be passed. The number of jackets through which the heating medium, preferably steam, is actually passed, is adjusted to effectively change the quantity of heat to be applied to the heat tube. The adjustment of the number of the jackets through which the heating medium preferably steam is actually passed results in the change of the extraction amount of the slurry washed by counter-flow, due to changes in the pressures along the length of the heat tube as a result of the temperature changes due to the heating jackets, but the change is not continuous. It is therefore preferable to continuously change the amount of the liquid which is separately introduced into the tube in line 9 of the drawing, which liquid is preferably one having a composition similar to the washing liquid, thereby continuously changing the extraction amount of the slurry washed by the counter-flow. From the viewpoint of the controllability and the simplification of the apparatus, it is preferable to change the amount of the liquid separately introduced into the heat tube as above to further control the discharge of the slurry in conjunction with the change in the quantity of heat for the reasons which will be subsequently discussed.

In effect, the present invention is an improvement over the process of U.S. application Ser. No. 724,635, filed Apr. 16, 1985 dealing with a process for the continuous discharge of slurry, particularly in a polymerization process similar to the type claimed herein. According to the process of Ser. No. 724,635, a polymeric slurry of solid polymer particles and a diluent is transferred from a first zone maintained under pressure sufficient for holding the diluent in the liquid phase into a heat piping, which heat piping consists of a heat tube covered with two or more divisional heating jackets, said diluent being one which is gaseous under normal temperature and pressure and subsequently separating and recovering the substantially dried solid particles and vapor of the evaporated diluent from a second zone substantially maintained under atmospheric pressure. The improvement according to this copending application (of the same assignee company) is that in the said application, the improvement involves controlling the discharge of the slurry by means of (1) varying the number of the heating jackets in which steam is introduced in the heating tube and (2) separately introducing and controlling the amount of a liquid hydrocarbon or halogenated hydrocarbon into the heat tubing, which liquid hydrocarbon or halogenated hydrocarbon is gaseous at normal temperature and under normal pressure.

The instant process uses both of the parameters (1) and (2) in both embodiments of the present invention to control the extraction amount of the washed slurry and thus an understanding how these parameters operate to control the extract amount is essential.

The present invention uses the same principal as that of the copending application Ser. No. 724,635. That is, according to the present invention, the heating jackets C1, C2 and C6 control the temperature in the heating tube 10 such that the slurry extract from the counter-flow washing column B through line 8 is controlled in that as the temperature increases along the heat tube 10 through the heating jackets, the pressure is increased in the heat tube and the pressure differential between the counter-flow washing column and the heating tube is decreased, thereby decreasing the flow of slurry into the heat tube. On the other hand, as the temperature is decreased by decreasing the number of steam jackets, the flow rate of the slurry is increased, that is, when the heating jackets are turned off or decreased, the slurry in the heating zones are cooled, which decreases the pressure in the heating zones within the tube (because less of the washing liquid or diluent is in the gaseous phase) and the pressure differential between the counter-flow washing column and the heating tube is increased (i.e. the pressure of the slurry in the counter washing column B is significantly greater than that of the heat tube), which in turn increases the flow of slurry extract from the counter-flow washing column B to the heating tube 10 through line 8.

To understand more concretely the mechanism involved, the heating tube is subdivided into a plurality of heating subzones by using a series of heating jackets into which the steam is supplied to a heating pipe and the pressure loss across the length of section of the tube varies widely according to the ratio of vapor to liquid. Thus, the flow rate of the polymer slurry passing through a section across which a given pressure differential exits can be controlled by modifying the heat conditions and hence the vaporization rate of the diluent along the flow path. This permits in itself the control of the slurry discharge without the use of a mechanical flow valve.

To further control the discharge of the slurry from the counter-flow washing column B into the heating tube 10, however, a liquid, such as a liquid hydrocarbon or a halogenated hydrocarbon is introduced into line 9 to further control the pressure, which hydrocarbons etc. are ordinarily gaseous at normal temperature and normal pressure. By separately introducing the hydrocarbons or halogenated hyrocarbons etc. into the heating zone or heating tube, this further controls the pressure in the heating zone so that the pressure in the heat tube can be finely tuned so as to control the pressure differential between the counter-flow washing column B and the heat tube 10, and along the heat tube itself, thus controlling the flow of slurry discharge at a constant rate. Of course, the more liquid separately introduced through line 9, the greater the pressure increase and the less liquid introduced, the less pressure in the heat tube and by synchronizing these two factors, i.e the control of the heating jackets and the introduction of the liquid hydrocarbons separately through line 9, the flow discharge of the slurry can be controlled very well indeed.

Thus, the present invention is a variation of Ser. No. 724,635 in that the amount of slurry discharge from a washing column is controlled through the adjustment of the quantity of heat to be added to the heat tube as pointed out above and, when necessary, the amount of liquid to be separately introduced into the heat tube and, additionally, the amount of slurry in the last polymerization reaction cell is used as a control factor as discussed above. That is, as the level of the slurry in the last polymerization reaction cell is elevated or lowered, the amount of the washed slurry to be extracted from the lower portion of the counter-flow washing column is increased or decreased accordingly and thus the level of the slurry in the last reaction cell must be monitored to ultimately control the amount of washed slurry extracted by means of controlling the temperature of the heat tube and the liquid separately introduced as previously discussed.

Although the fundamental operation of the control of the discharged amount of slurry by controlling the heat in the heating tube through the heating jackets and the concept of adding liquid hydrocarbon separately to control the discharge rate has been discussed somewhat in detail herein, Applicants hereby incorporate by reference the description of Ser. No. 724,635 in the present application. In respect to the mechanism of controlling the pressure in the heat tube by means of the heat alone, reference is also made to U.S. Pat. No. 4,126,743, which originated from the same Assignee company as that of the present application. This patent was also described in Ser. No. 724,635 and is also incorporated by reference herein.

Through the above-mentioned method, it is possible to obtain solid polymer particles of relatively stable quality, overcoming relatively small fluctuations in the production amount of slurry in the continuous polymerization zone. In the production of polymers on an industrial basis, however the production amount of slurry often fluctuates quite heavily. In such case, the above-mentioned control method is not sufficient for preventing the degradation of the quality of the solid polymer particles and the entrainment of the solid polymer particles in the washing liquid to be extracted from the upper portion the counter-flow washing column, which may cause blockage of the flow-amount controller or adversely affect the recovery of the washing liquid.

In order to carry out the method of operating a counter-flow washing system for washing polymeric slurries on an industrial scale, the inventors have intensely investigated the technical causes of the aforementioned heavy fluctuations and found that they are caused by the drastic fluctuation in the ascending velocity of the washing liquid in the counter-flow washing column (hereinafter called simply the "ascending velocity"). On the basis of this this finding, research has been carried out to determined any method for maintaining the ascending velocity of the washing liquid constant in the counter-flow washing column.

It has now been found that the ascending velocity is determined by (a) the amount "A1" of the liquid to be separately introduced into the heat tube, (b) the amount "A2" of the vapor separated by the heat tube and (c) the amount "A4" of the washing liquid to be introduced into the counter-flow washing column. Thus, it is possible to deal with said heavy fluctuation of the production amount in the continuous polymerization zone by the following method, which represents a second embodiment of the invention:

First, the change of the production amount of slurry in the continuous polymerization is detected by the change of slurry level in the last reaction cell A, and then corresponding to this change, the extraction amount of the slurry from the counter-flow washing column is changed by the method similar to described in the first embodiment of the present invention where large fluctuations of the slurry do not ordinarily occur. Corresponding to the change of the ascending velocity caused by said change of the extraction amount of the slurry, the amount "A4" of the washing liquid is changed in accordance with the combination of the amount "A1" of the liquid to be separately introduced and the amount "A2" of the vapor, that is, the amount "A3"="A2"−"A1".

Further, as occasion demands, the amount of the washing liquid to be extracted from the upper portion of the counter-flow washing column is changed. A preferable result can be obtained by changing this amount of the washing liquid to be extracted from the upper portion of the counter-flow washing column approximately in proportion to the amount "A2"−"A1"="A3".

The concrete examples of the present invention will further be explained in detail by means of the drawings attached hereto.

EXAMPLES OF WORKING EMBODIMENTS

In the drawing, the continuous polymerization zone is shown as to its last reaction cell (A). Any type of the reaction cells may be used for the cells before the last cell.

The slurry in the last polymerization cell (A) is circulated by means of a pump (1) and is divided by valves (V1-1) (V1-2) into two, one to return to the last polymerization cell (A) and the other to be introduced into the counter-flow washing column (B). So long as the fluctuation of the production amount of the slurry in the polymerization zone is small, the control can be made by detecting the pressure in the counter-flow washing column (B) and controlling the opening degree of the valve (V1-2) so that the pressure is made constant. The amount of the washing liquid to be introduced into the counter-flow washing column (B) is made constant by operating the valve (V3) under the control by the flow-amount controller (F1). Similarly the amount of the washing liquid to be extracted from the counter-flow washing column (B) is made constant by operating the valve (V2) on the basis of the data detected by the flow-amount detector (F2).

The amount of the slurry in the last polymerization cell (A) is detected by the level detector ($L_1$). Usually by the operation of the valve (V4) in accordance with the detected level, the amount of the liquid to be introduced into the heat tube is changed to control the amount of the slurry to be extracted from the counter-flow washing column. In this connection, it is also possible to change the quantity of heat to be applied to the heat tube by opening or closing the valves (V5-1), (V5-2), (V5-3), (V5-4), (V5-6) and (V5-7), in addition to the change of the amount of the liquid (through line 9) to be introduced into the heat tube. This is made by changing the number of heating jackets to which the steam is actually introduced. The discontinuous fluctuation of the extraction amount of the slurry owing to the change in the number of the heating jackets is compensated for by adjusting the amount of the liquid introduced into the heat tube, mainly by adjusting the opening degree of the valve V4 so as to control the discharge slurry rate so it is discharged at a constant rate. In this case, it is necessary to check beforehand the amount of the liquid to be introduced into the heat tube for compensating the increased extraction amount of the slurry when the number of the heating jackets to which the steam is introduced is reduced etc. and to store this date in the controller (Z). The mechanism by which the heating jackets and the amount of liquid introduced into the heating tube control the amount of slurry extract have been described above.

In another example of the present invention, further data are collected by detecting the amount "A2" of the vapor separated by the heat tube and the amount "A1" of the liquid introduced into the heat tube by means of the flow meters (F3) and (F4), respectively, the data are processed in the controller (W) to change the amount "A4" of the washing liquid to be introduced into the counter-flow washing column (B) by the operation of the valve (3) and the extraction amount "A5" of the washing liquid by the operation of the valve (V2). In this case, the preferably control processing formula is as follows:

$$k_1[k_2+(k_2.A2-A1)] \leq A4 \leq k_1[k_4+(k_3.A2-A1)]$$

wherein $k_1$, $k_2$, $k_3$, and $k_4$ are constants, which are determined by the shape of the counter-flow washing column and the kind of the slurry to be treated. In the case of the slurry consisting of polypropylene and propylene, $k_1$ and $k_3$ are approximately equal to 1 and $k_2$ and $k_4$ are about $1 \times S - 15 \times S$ cm$^3$, wherein S is the cross section of the narrower portions of the counter-flow washing column and the unit of "A1", "A2" and "A4" is expressed by volume at the temperature of the counter-flow washing column.

The preferable control processing formula as to "A5" is as follows:

$$k_1[k_2+(k_3.A2-A1)]+k_5(k_3.A2-A1) \leq A5 \leq k_1[k_4+(k_3.A2-A1)]+k_5(k_3.A2-A1)$$

wherein $k_5$ is the value determined by the concentration of the solid polymer particles in the slurry produced in the polymerization zone. In the case of the slurry consisting of polypropylene and propylene, $k_5$ usually is about 1–3.

The above mentioned method is applied to a plant working on the production rate of polypropylene being 1 ton/hour [ton=meter ton (=1,000 kg)] and the fluctuation of the slurry production at the slurry concentration of 50% by weight is ±4%. The counter-flow washing column used is one having a length of 5 m, inner diameters 0.7 m and 1.4 m and the amount of washing liquid introduced therein and extracted therefrom are respectively made constant, namely 1.28 ton/hr and 1.45 ton/hr. Under the conditions of maintaining the liquid surface in the last reaction cell constant, the efficiency of the counter-flow washing column calculated from the removal ratio of the catalyst is 95±0.5% and thus a stable operation is performed.

On the other hand, under the operation including the change of production amount of slurry within the range of ±10%, which change is made by changing the production amount between 1.2 ton/hour and 1.0 ton/hour for producing products of different brands, and also including the change of the amounts of washing liquid to be introduced and to be extracted, the efficiency of the counter-flow washing column is 95±0.2%, and thus a highly stable operation can be carried out.

The above describes the essential features of the present invention. After the polymeric slurry leaves the heat tube, the polymer slurry is transferred to a lower pressure zone in cyclone D where the polymer particles and the vapor are separated in such a manner that the vapor is discharged from line 3 and the polymer particles are transferred to the hopper E where the polymer particles are discharged through line 4.

According to Applicants' method, a very efficient method of continuously opening a counter-flow washing column has been invented, which method represents a distinct advance over the prior art methods.

What we claim is:

1. A method of continuously operating a counter-flow washing column by:
   (a) introducing slurry, which consists of solid polymer particles and a diluent and is continuously extracted from a continuous polymerization zone into the upper portion of the counter-flow washing column, said polymerization zone including a last reaction cell just before the counter-flow washing column,
   (b) introducing washing liquid into the lower portion of the counter-flow washing column and extracting it from the upper portion of the counter-flow washing column, and
   (c) extracting washed slurry from the lower portion of the column and introducing it into a heat tube to separate the vapor of the washing liquid and the solid polymer particles,
   the improvement wherein the extraction amount of the washed slurry from the lower portion of the column is controlled by means of:
   (i) controlling the quantity of heat added to the heat tube, and further
   (ii) separately introducing a liquid into the heat tube and controlling the amount of liquid separately introduced into the heat tube, said control of the extraction amount of the wash slurry by means (i) and (ii) being carried out by monitoring the amount of the slurry in the last reaction cell of the continuous polymerization zone and regulating the amount of extracted slurry in response to fluctuations in the amount of slurry produced in the polymerization zone through said control means (i) and (ii).

2. A method as set forth in claim 1, wherein the solid polymer particles are those selected from the group consisting of polypropylene or copolymers of propylene and other mono-olefins, and the diluent, the washing liquid and the liquid to be separately introduced are liquids mainly consisting of propylene.

3. A method as set forth in the claim 1, wherein the amount of the washing liquid to be introduced into the lower portion of the counter-flow washing column and the amount of same to be extracted from the upper portion of the counter-flow washing column respectively are controlled to be constant by means of flow-amount controllers.

4. In a method of continuously operating a counter-flow washing column by:
(a) introducing slurry, which consists of solid polymer particles and a diluent and is continuously extracted from a continuous polymerization zone, into the upper portion of the counter-flow washing column said continuous polymerization zone including a last reaction cell just before the counter-flow washing column;
(b) introducing washing liquid into the lower portion of the counter-flow washing column and extracting it from the upper portion of the counter-flow washing column, and
(c) extracting wash slurry from the lower portion of the column and introducing it into a heat tube to separate the vapor of the washing liquid and the solid polymer particles, the improvement wherein (I) the extraction amount of the washed slurry from the lower portion of the column is controlled by means of:
(i) the quantity of heat added to the heat tube, and further
(ii) controlling the amount "A1" of liquid to be separately introduced into the heat tube, said control of the extraction amount of the washed slurry in (i) and (ii) being carried out by monitoring the amount of the slurry in the last reaction cell of the continuous polymerization zone and modulating the parameters (i) and (ii) in response to fluctuations in amount of slurry in said cell to control the amount of extraction slurry, and (II) the amount of the washing liquid introduced into the lower portion of the counter-flow washing column is controlled by means of
(iii) the amount A3 corresponding to the difference between the amount A2 of the vapor separated by the heat tube and the amount A1 of the liquid separately introduced into the heat tube.

5. A method as set forth in the claim 4, wherein the solid polymer particles are those selected from the group consisting of polypropylene or copolymers of propylene and other mono-olefins, and the diluent, the washing liquid and the liquid to be separately introduced are liquids mainly consisting of propylene.

* * * * *